(12) United States Patent
Uehara et al.

(10) Patent No.: US 9,188,815 B2
(45) Date of Patent: Nov. 17, 2015

(54) LIQUID CRYSTAL OPTICAL APPARATUS AND IMAGE DISPLAY DEVICE

(71) Applicants: Shinichi Uehara, Tokyo (JP); Masako Kashiwagi, Kanagawa-ken (JP); Ayako Takagi, Kanagawa-ken (JP); Masahiro Baba, Kanagawa-ken (JP); Yuko Kizu, Kanagawa-ken (JP); Yoshiharu Momonoi, Kanagawa-ken (JP)

(72) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP); Yuko Kizu, Kanagawa-ken (JP); Yoshiharu Momonoi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 482 days.

(21) Appl. No.: 13/728,197

(22) Filed: Dec. 27, 2012

(65) Prior Publication Data

US 2013/0250188 A1 Sep. 26, 2013

(30) Foreign Application Priority Data

Mar. 21, 2012 (JP) ................................. 2012-064581

(51) Int. Cl.
*G02F 1/1343* (2006.01)
*G02F 1/1333* (2006.01)
(Continued)

(52) U.S. Cl.
CPC .... *G02F 1/134309* (2013.01); *G02F 1/133345* (2013.01); *G02F 1/29* (2013.01); *G02B 27/2214* (2013.01); *G02F 2001/13373* (2013.01); *G02F 2001/134381* (2013.01); *G02F 2001/294* (2013.01)

(58) Field of Classification Search
USPC ................................................ 349/141, 144
See application file for complete search history.

(56) References Cited

U.S. PATENT DOCUMENTS

2006/0164593 A1 7/2006 Peyghambarian et al.
2011/0084961 A1 4/2011 Son et al.
(Continued)

FOREIGN PATENT DOCUMENTS

CN 102193202 A 9/2011
JP 2010-127976 6/2010
(Continued)

OTHER PUBLICATIONS

Notification of the First Office Action issued by the State Intellectual Property Office of the People's Republic of China on Apr. 16, 2015, for Chinese Patent Application No. 201310047967.0, and English-language translation thereof.
(Continued)

*Primary Examiner* — Lucy Chien
(74) *Attorney, Agent, or Firm* — Finnegan, Henderson, Farabow, Garrett & Dunner, L.L.P.

(57) ABSTRACT

According to one embodiment, liquid crystal optical apparatus includes a first substrate unit, a second substrate unit, and a liquid crystal layer. The first substrate unit includes a first substrate, first electrodes extending in a first direction, a first sub electrode, and a second sub electrode. The second substrate unit includes a second substrate and an opposing electrode. The liquid crystal layer is provided between the first and second substrate units and. The first substrate unit including at least one selected from: a first distance between the one electrode of the first electrodes and the first sub electrode longer than a second distance between the other electrode of the first electrodes and the second sub electrode; and a first width of the first sub electrode narrower than a second width of the second sub electrode.

19 Claims, 5 Drawing Sheets

(51) Int. Cl.
 G02B 27/22 (2006.01)
 G02F 1/1337 (2006.01)
 G02F 1/29 (2006.01)

(56) References Cited

U.S. PATENT DOCUMENTS

2011/0096252 A1\* 4/2011 Im .................................. 349/15
2011/0228181 A1 9/2011 Jeong et al.

FOREIGN PATENT DOCUMENTS

JP 2011-197640 10/2011
KR 10-2011-0038936 4/2011

OTHER PUBLICATIONS

Notification of Reason(s) for Refusal issued by the Japanese Patent Office on Jun. 18, 2014, for Japanese Patent Application No. 2012-064581, and English-language translation thereof.

\* cited by examiner

LIQUID CRYSTAL OPTICAL APPARATUS AND IMAGE DISPLAY DEVICE

CROSS-REFERENCE TO RELATED APPLICATIONS

This application is based upon and claims the benefit of priority from the prior Japanese Patent Application No. 2012-064581, filed on Mar. 21, 2012; the entire contents of which are incorporated herein by reference.

FIELD

Embodiments described herein relate generally to a liquid crystal optical apparatus and an image display device.

BACKGROUND

A liquid crystal optical apparatus is known that utilizes the birefringence of liquid crystal molecules to change the distribution of the refractive index according to the application of a voltage. There is a stereoscopic image display device that combines such a liquid crystal optical apparatus with an image display unit.

Such a stereoscopic image display device switches between a state in which an image displayed on the image display unit is caused to be incident on the eye of a human viewer as displayed on the image display unit and a state in which the image displayed on the image display unit is caused to be incident on the eye of the human viewer as multiple parallax images by changing the distribution of the refractive index of the liquid crystal optical apparatus. Thereby, a two-dimensional display operation and a three-dimensional image display operation are realized. Also, technology is known that modifies the path of the light by utilizing the optical principle of a Fresnel zone plate. High display quality is desirable for such display devices.

DETAILED DESCRIPTION

Figure 1:
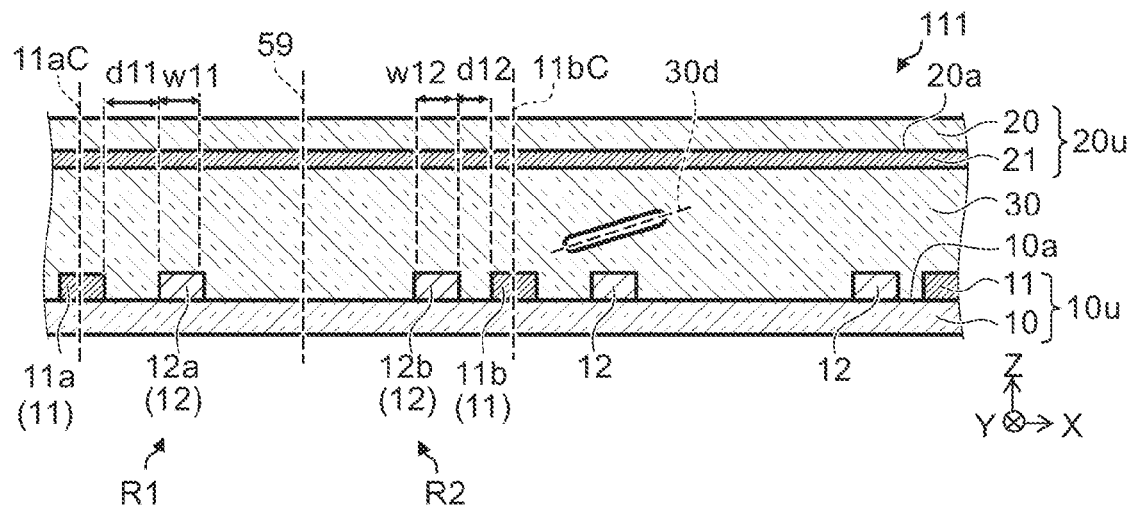
FIG. 1 is a schematic cross-sectional view illustrating the configuration of a liquid crystal optical apparatus according to a first embodiment.

According to one embodiment, a liquid crystal optical apparatus includes a first substrate unit, a second substrate unit, and a liquid crystal layer. The first substrate unit includes a first substrate having a first major surface, a plurality of first electrodes provided on the first major surface to extend in a first direction, the first electrodes being arranged in a direction intersecting the first direction, a first sub electrode, and a second sub electrode. The first sub electrode is provided on the first major surface to extend in the first direction in a first region between a central axis and one electrode of most proximal first electrodes when projected onto a plane parallel to the first major surface. The central axis is parallel to the first direction to pass through a midpoint of a line segment connecting a center of the one electrode and a center of the other electrode of the most proximal first electrodes along a second direction. The second direction is parallel to the plane and perpendicular to the first direction. The second sub electrode is provided on the first major surface to extend in the first direction in a second region between the central axis and the other electrode when projected onto the plane. The second substrate unit includes a second substrate having a second major surface opposing the first major surface, and an opposing electrode provided on the second major surface. The liquid crystal layer is provided between the first substrate unit and the second substrate unit. The liquid crystal layer has a pretilt including a director of a liquid crystal oriented from the first substrate unit toward the second substrate unit along the second direction from the one electrode toward the other electrode. The first substrate unit including at least one selected from: a first distance along the second direction between the one electrode and the first sub electrode being longer than a second distance along the second direction between the other electrode and the second sub electrode; and a first width of the first sub electrode along the second direction being narrower than a second width of the second sub electrode along the second direction.

Embodiments of the invention will now be described with reference to the drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating the configuration of a liquid crystal optical apparatus according to a first embodiment.

As illustrated in FIG. 1, the liquid crystal optical apparatus 111 according to this embodiment includes a first substrate unit 10*u*, a second substrate unit 20*u*, and a liquid crystal layer 30.

The first substrate unit 10u includes a first substrate 10, multiple first electrodes 11, and multiple second electrodes 12. In this example, at least a first sub electrode 12a and a second sub electrode 12b are provided as the second electrodes 12.

The first substrate 10 has a first major surface 10a. The multiple first electrodes 11 are provided on the first major surface 10a. Each of the multiple first electrodes 11 extends in a first direction. The multiple first electrodes 11 are arranged in a direction intersecting the first direction.

The first direction is taken as a Y-axis direction. A direction parallel to the major surface 10a and perpendicular to the Y-axis direction is taken as an X-axis direction. A direction perpendicular to the X-axis direction and the Y-axis direction is taken as a Z-axis direction.

For example, the multiple first electrodes 11 are arranged along the X-axis direction.

FIG. 1 illustrates three of the multiple first electrodes 11. The number of the multiple first electrodes 11 is arbitrary.

Two most proximal first electrodes 11 of the multiple first electrodes 11 will now be focused upon. One electrode of the two most proximal first electrodes 11 is taken as a first main electrode 11a. The other electrode of the two most proximal first electrodes 11 is taken as a second main electrode 11b.

A central axis 59 is between the most proximal first electrodes 11 (e.g., the first main electrode 11a and the second main electrode 11b). The central axis 59 is parallel to the Y-axis direction to pass through the midpoint of a line segment connecting an X-axis direction center 11aC of the first main electrode 11a to an X-axis direction center 11bC of the second main electrode 11b when projected onto the X-Y plane (a plane parallel to the first major surface 10a).

The region of the first major surface 10a between the central axis 59 and the first main electrode 11a which is the one electrode of the two most proximal first electrodes 11 is taken as a first region R1. The region of the first major surface 10a between the central axis 59 and the second main electrode 11b which is the other electrode of the two most proximal first electrodes 11 is taken as a second region R2. The direction from the first main electrode 11a toward the second main electrode 11b is taken as the +X direction (a second direction). The direction from the second main electrode 11b toward the first main electrode 11a corresponds to the −X direction.

The first sub electrode 12a of the multiple second electrodes 12 is provided on the first major surface 10a to extend in the Y-axis direction in the first region R1.

The second sub electrode 12b of the multiple second electrodes 12 is provided on the first major surface 10a to extend in the Y-axis direction in the second region R2.

The second substrate unit 20u includes a second substrate 20 and an opposing electrode 21. The second substrate 20 has a second major surface 20a opposing the first major surface 10a. The opposing electrode 21 is provided on the second major surface 20a.

In the specification, the state of being opposed includes not only the state of directly facing each other but also the state of facing each other with another component inserted therebetween.

The liquid crystal layer 30 is provided between the first substrate unit 10u and the second substrate unit 20u. The liquid crystal layer 30 has a pretilt. In this pretilt, a director 30d of the liquid crystal is oriented from the first substrate unit 10u toward the second substrate unit 20u along the +X direction from the first main electrode 11a toward the second main electrode 11b.

In this embodiment, the distance (a first distance d11) along the +X direction between the first main electrode 11a and the first sub electrode 12a is longer than the distance (a second distance d12) along the +X direction between the second main electrode 11b and the second sub electrode 12b. As described below, the width (a first width w11) of the first sub electrode 12a along the +X direction may be narrower than the width (a second width w12) of the second sub electrode 12b along the +X direction.

In other words, the first substrate unit 10u includes at least one selected from the second distance d12 being shorter than the first distance d11 and the second width w12 being wider than the first width w11.

In other words, in the embodiment, asymmetry is introduced for the widths or the disposition of the electrodes. Thereby, as described below, disorder of the alignment of the liquid crystal can be suppressed; and a liquid crystal optical apparatus that provides a high-quality display is obtained.

The first substrate 10, the first electrodes 11 (e.g., the first main electrode 11a, the second main electrode 11b, etc.), the second electrodes 12 (e.g., the first sub electrode 12a, the second sub electrode 12b, etc.), the second substrate 20, and the opposing electrode 21 are transmissive with respect to light. Specifically, these components are transparent.

The first substrate 10 and the second substrate 20 may include, for example, a transparent material such as glass, a resin, etc. The first substrate 10 and the second substrate 20 have plate configurations or sheet configurations. The thicknesses of the first substrate 10 and the second substrate 20 are, for example, not less than 50 micrometers (μm) and not more than 2000 μm. However, the thicknesses are arbitrary.

The first electrodes 11, the second electrodes 12, and the opposing electrode 21 include, for example, an oxide including at least one (one type) of element selected from the group consisting of In, Sn, Zn, and Ti. These electrodes may include, for example, ITO. For example, at least one selected from $In_2O_3$ and $SnO_3$ may be used. The thicknesses of these electrodes are, for example, about 200 nanometers (nm) (e.g., not less than 100 nm and not more than 350 nm). For example, the thicknesses of the electrodes are set to be thicknesses to obtain a high transmittance with respect to visible light.

The disposition pitch of the first electrodes 11 (the distance between the X-axis direction centers of the most proximal first electrodes 11) is, for example, not less than 10 μm and not more than 1000 μm. The disposition pitch is set to meet the desired specifications (the characteristics of the gradient index lens described below).

For example, the length (the width) of the first electrode 11 along the X-axis direction is not less than 5 μm and not more than 300 μm.

For example, the length (the width) of the second electrode 12 along the X-axis direction is not less than 5 μm and not more than 300 μm.

The liquid crystal layer 30 includes a liquid crystal material. The liquid crystal material includes a nematic liquid crystal (having a nematic phase at the temperature of use of the liquid crystal optical apparatus 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment.

In the embodiment, the alignment of the liquid crystal of the liquid crystal layer 30 has a pretilt. The pretilt angle is the angle between the X-Y plane and the director 30*d* of the liquid crystal (the long-axis direction axis of the liquid crystal molecules). In the case of the horizontal alignment, the pretilt angle is, for example, greater than 0° and less than 45°. In the vertical alignment, the pretilt angle is, for example, greater than 45° and less than 90°.

For convenience in the specification, the horizontal alignment refers to the case where the pretilt angle is less than 45°; and the vertical alignment refers to the case where the pretilt angle exceeds 45°.

For example, the direction of the pretilt can be determined by a crystal rotation method, etc. Also, the direction of the pretilt can be determined by changing the alignment of the liquid crystal by applying a voltage to the liquid crystal layer 30 and observing the optical characteristics of the liquid crystal layer 30 during this change.

In the case where alignment processing of the first substrate unit 10*u* is performed by, for example, rubbing, etc., the rubbing direction is along the +X direction.

The axis of the director 30*d* may be parallel to the +X direction or non-parallel to the +X direction when the director 30*d* of the liquid crystal is projected onto the X-Y plane. The direction of the pretilt has a +X direction component when the direction of the pretilt is projected onto the X axis.

The orientation direction of the liquid crystal layer 30 proximal to the second substrate unit 20*u* is antiparallel to the orientation direction of the liquid crystal layer 30 proximal to the first substrate unit 10*u*. In other words, the initial alignment is not a splay alignment.

The first substrate unit 10*u* may further include an alignment film (not illustrated). The first electrodes 11 and the second electrodes 12 are disposed between the first substrate 10 and the alignment film of the first substrate unit 10*u*. The second substrate unit 20*u* may further include an alignment film (not illustrated). The opposing electrode 21 is disposed between the second substrate 20 and the alignment film of the second substrate unit 20*u*. These alignment films may include, for example, polyimide. The initial alignment of the liquid crystal layer 30 is obtained by, for example, performing rubbing of the alignment film. The direction of the rubbing of the first substrate unit 10*u* is antiparallel to the rubbing direction of the second substrate unit 20*u*. The initial alignment may be obtained by performing light irradiation of the alignment film.

The case will now be described where the dielectric anisotropy of the liquid crystal included in the liquid crystal layer 30 is positive and the initial alignment is the horizontal alignment.

The liquid crystal alignment of the liquid crystal layer 30 is changed by applying voltages between the opposing electrode 21 and the first electrodes 11 and between the opposing electrode 21 and the second electrodes 12. A refractive index distribution is formed in the liquid crystal layer 30 according to this change; and the travel direction of the light that is incident on the liquid crystal optical apparatus 111 is changed by the refractive index distribution. The change of the travel direction of the light is mainly based on the refraction effect.

Figure 2:
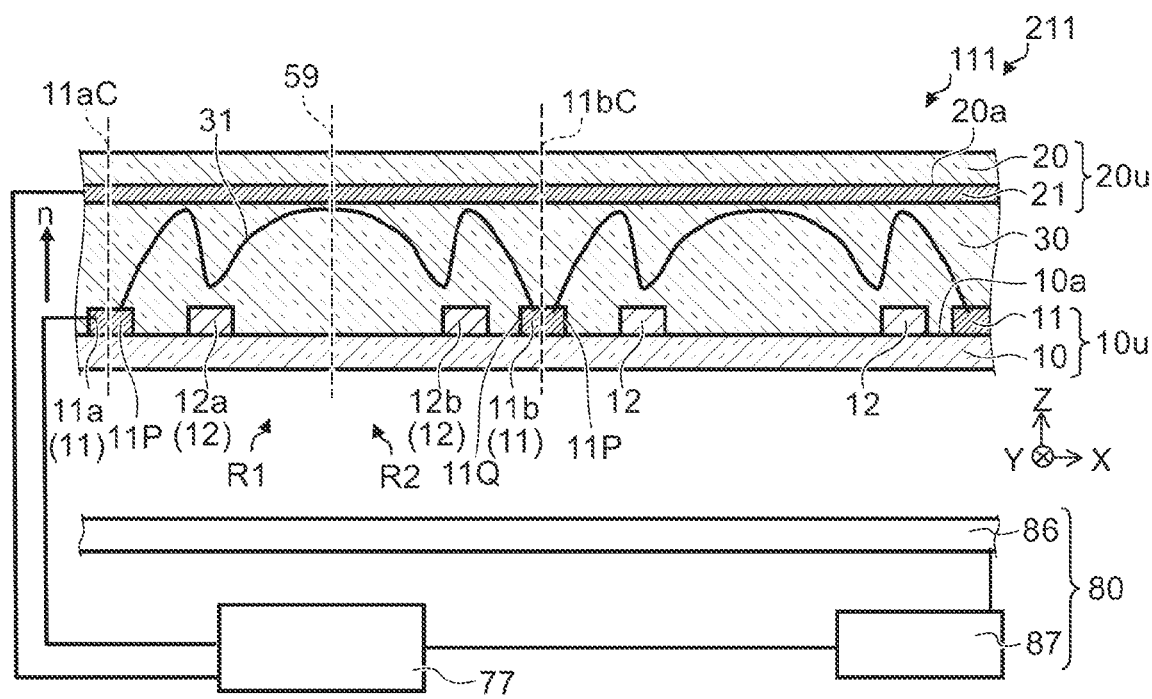
FIG. 2 is a schematic cross-sectional view illustrating the state of use of the liquid crystal optical apparatus according to the first embodiment.

FIG. 2 is a schematic cross-sectional view illustrating the state of use of the liquid crystal optical apparatus according to the first embodiment.

As illustrated in FIG. 2, the liquid crystal optical apparatus 111 is used with an image display unit 80. An image display device 211 according to the embodiment includes the image display unit 80 and any of the liquid crystal optical apparatuses according to the embodiments (in this example, the liquid crystal optical apparatus 111). Any display device may be used as the image display unit 80. For example, a liquid crystal display device, an organic EL display device, a plasma display, etc., may be used.

The image display unit 80 includes a display unit 86. The display unit 86 is stacked with the liquid crystal optical apparatus 111. The display unit 86 causes light including image information to be incident on the liquid crystal layer 30. The image display unit 80 may further include a display control unit 87 that controls the display unit 86. The display unit 86 produces light that is modulated based on the signal supplied from the display control unit 87 to the display unit 86. For example, the display unit 86 emits light that includes multiple parallax images. As described below, the liquid crystal optical apparatus 111 has an operating state in which the optical path is modified, and an operating state in which the optical path is substantially not modified. For example, the image display device 211 provides a three-dimensional display by the light being incident on the liquid crystal optical apparatus 111 in the operating state in which the optical path is modified. For example, the image display device 211 provides a two-dimensional image display in the operating state in which the optical path is substantially not modified.

As illustrated in FIG. 2, the liquid crystal optical apparatus 111 may further include a control unit 77. The control unit 77 may be connected to the display control unit 87 by a wired or wireless method (an electrical method, an optical method, etc.). The image display device 211 may further include a control unit (not illustrated) that controls the control unit 77 and the display control unit 87.

Figure 3:
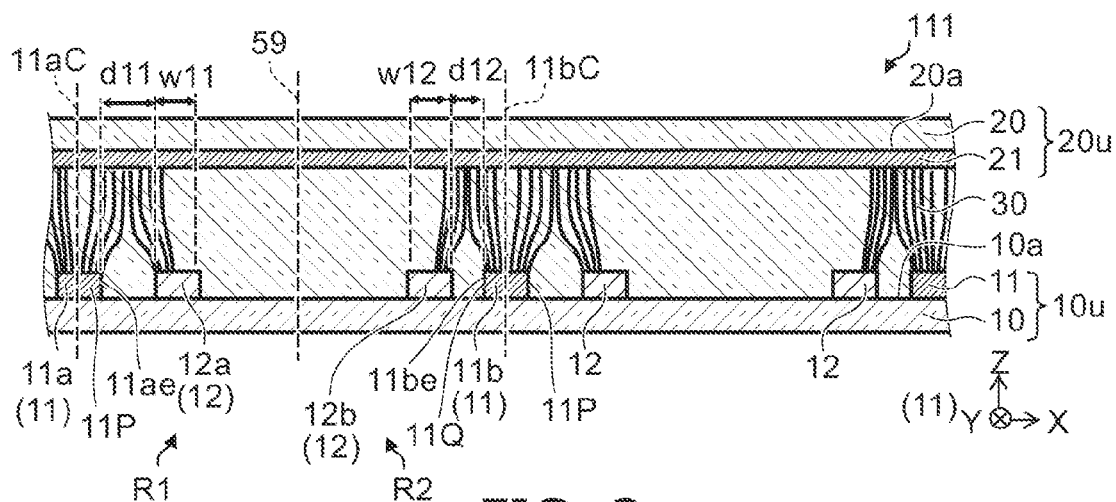
FIG. 3 is a schematic view illustrating characteristics of the liquid crystal optical apparatus according to the first embodiment.

The control unit 77 is electrically connected to the first electrodes 11, the second electrodes 12, and the opposing electrode 21. Although the interconnect between the control unit 77 and the first electrodes 11 and the interconnect between the control unit 77 and the opposing electrode 21 are illustrated in FIG. 3, the interconnect between the control unit 77 and the second electrodes 12 is omitted for easier viewing. The control unit 77 applies a first voltage between the opposing electrode 21 and the first electrodes 11 and a second voltage between the opposing electrode 21 and the second electrodes 12.

For convenience in the specification, the state in which the potential is the same (is zero volts) between two electrodes also is taken to be included in the state in which the voltage is applied.

The first voltage and the second voltage may be direct-current voltages or alternating current voltages. For example, the polarities of the first voltage and the second voltage may change periodically. For example, the potential of the opposing electrode 21 may be fixed; and the potential of the first electrodes 11 may be changed as alternating current. The polarity of the potential of the opposing electrode 21 may change periodically; and the potential of the first electrodes 11 may be changed in conjunction with the change of the polarity of the potential of the opposing electrode 21 but with an opposite polarity. In other words, common inversion driving may be performed. Thereby, the power supply voltage of the drive circuit can be reduced; and the breakdown voltage specifications of the drive IC are relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first voltage and the second voltage are set to be greater than the threshold voltage Vth. The liquid crystal alignment of the liquid crystal layer 30 is changed by the application of the voltages.

An alignment in which the tilt angle of the liquid crystal is large (e.g., the vertical alignment) is formed in the liquid crystal layer 30 of the regions where the first voltage and the second voltage are applied. The effective refractive index of this region approaches the refractive index ($n_O$) with respect to ordinary light.

On the other hand, a voltage is not applied along the Z-axis direction in the region between the first main electrode 11a and the first sub electrode 12a, the region between the first sub electrode 12a and the second sub electrode 12b, and the region between the second sub electrode 12b and the second main electrode 11b. The initial alignment (e.g., the horizontal alignment) or an alignment that is near the initial alignment is formed in these regions. The refractive index of these regions with respect to the light that vibrates in the X-axis direction approaches the refractive index ($n_e$) with respect to extraordinary light. Thereby, a refractive index distribution 31 is formed in the liquid crystal layer 30.

In the refractive index distribution 31, for example, the change of the refractive index is not less than about 20% and not more than about 80% of the difference between the refractive index with respect to extraordinary light and the refractive index with respect to ordinary light.

For example, the refractive index distribution 31 has a configuration corresponding to the distribution of the thickness of a Fresnel lens. The liquid crystal optical apparatus 111 functions as a liquid crystal GRIN lens (Gradient Index lens) in which the refractive index changes in the plane. A lens that has optical characteristics having a lenticular configuration is formed in the liquid crystal optical apparatus 111.

In the refractive index distribution 31 that is formed, the position of the central axis 59 corresponds to the position of the lens center; and the positions of the first main electrode 11a and the second main electrode 11b correspond to the positions of the lens ends.

For example, in the liquid crystal optical apparatus 111, the operating state in which the optical path is modified is formed when the voltage is applied; and the operating state in which the optical path is substantially not modified is obtained when the voltage is not applied.

According to investigations of the inventor of the application, it was found that reverse tilt, in which the tilt direction of the liquid crystal reverses, occurs easily at the first electrodes 11 to which a high voltage is applied. The reverse tilt occurs because an electric field of the reverse direction with respect to the pretilt direction of the initial alignment of the liquid crystal layer 30 is applied. The reverse tilt occurs easily in the portion (a pretilt reverse side portion 11Q) of the first electrode 11 on the −X direction side of the center of the first electrode 11. On the other hand, the reverse tilt occurs easily in the portion (a pretilt forward side portion 11P) of the first electrode 11 on the +X direction side of the center of the first electrode 11.

There is a tendency for the reverse tilt to increase in operations in which the voltage is applied. In the case where the degree of the reverse tilt is pronounced, the alignment of the liquid crystal becomes disordered; the desired refractive index distribution 31 is not obtained; and the display quality decreases.

For example, it was found that the reverse tilt occurs easily in the case where the first sub electrode 12a and the second sub electrode 12b are disposed symmetrically with respect to the central axis 59 between the first main electrode 11a and the second main electrode 11b.

Conversely, it was found that the reverse tilt can be suppressed by increasing the electric field density at the pretilt reverse side portion 11Q of the first electrode 11 on the −X direction side of the center of the first electrode 11 where the reverse tilt occurs easily.

In other words, in the embodiment, the electric field density at the pretilt reverse side portion 11Q of the first electrode 11 is caused to be higher than the electric field density at the pretilt forward side portion 11P of the first electrode 11.

In the liquid crystal optical apparatus 111, the first distance d11 along the +X direction between the first main electrode 11a and the first sub electrode 12a is set to be longer than the second distance d12 along the +X direction between the second main electrode 11b and the second sub electrode 12b. In other words, the disposition of the second electrodes 12 is asymmetrical with respect to the central axis 59.

FIG. 3 is a schematic view illustrating characteristics of the liquid crystal optical apparatus according to the first embodiment.

FIG. 3 schematically illustrates the state of the lines of electric force of a portion of the liquid crystal layer 30 of the liquid crystal optical apparatus 111.

As illustrated in FIG. 3, the spacing between the lines of electric force at the pretilt reverse side portion 11Q of the first electrode 11 on the −X direction side of the center of the first electrode 11 is narrower than the spacing between the lines of electric force at the pretilt forward side portion 11P of the first electrode 11 on the +X direction side of the center of the first electrode 11. In other words, the electric field density at the pretilt reverse side portion 11Q is higher than the electric field density at the pretilt forward side portion 11P. This is because the first distance d11 along the +X direction between the first main electrode 11a and the first sub electrode 12a is longer than the second distance d12 along the +X direction between the second main electrode 11b and the second sub electrode 12b.

Thus, in this embodiment, the control unit 77 causes the electric field density on the portion (the pretilt reverse side portion 11Q) of the second main electrode 11b between the center 11bC of the second main electrode 11b and an end 11be of the second main electrode 11b on the first main electrode 11a side to be higher than the electric field density on the portion (the pretilt forward side portion 11P) of the first main electrode 11a between the center 11aC of the first main electrode 11a and an end 11ae of the first main electrode 11a on the second main electrode 11b side.

Thus, by the electric field density being asymmetrical, the occurrence of the reverse tilt at the pretilt reverse side portion 11Q can be suppressed. Thereby, a liquid crystal optical apparatus that provides a high-quality display is obtained.

For example, the first distance d11 is not less than 20 μm and not more than 200 μm. For example, the first distance d11 is not less than 1 times and not more than 10 times the thickness (the length along the Z-axis direction) of the liquid crystal layer 30. For example, the first distance d11 is not less than 0.05 times and not more than 0.4 times the disposition pitch of the first electrodes 11 (the distance between the center 11aC of the first main electrode 11a and the center 11bC of the second main electrode 11b).

For example, the second distance d12 is not less than 20 μm and not more than 200 μm. For example, the second distance d12 is not less than 0.5 times and not more than 10 times the thickness of the liquid crystal layer 30. For example, the second distance d12 is not less than 0.05 times and not more than 0.4 times the disposition pitch of the first electrodes 11.

For example, the absolute value of the difference between the first distance d11 and the second distance d12 is not less than 2 μm and not more than 20 μm. For example, the absolute value of the difference between the first distance d11 and the second distance d12 is not less than 0.5 times and not more than 1 times the thickness of the liquid crystal layer 30. For example, the absolute value of the difference between the first distance d11 and the second distance d12 is not less than 0.005 times and not more than 0.05 times the disposition pitch of the first electrodes 11.

Figure 4:
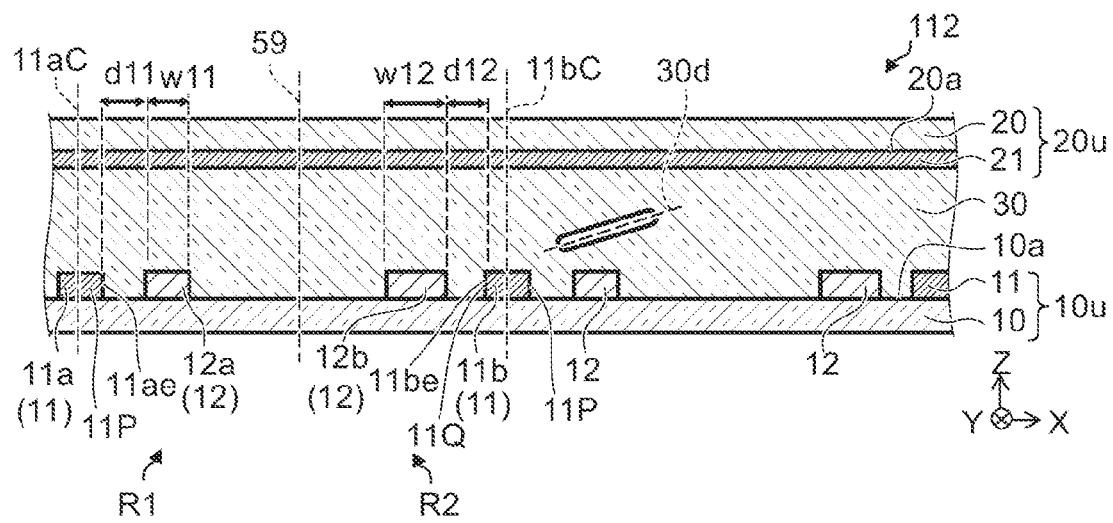
FIG. 4 is a schematic cross-sectional view illustrating the configuration of another liquid crystal optical apparatus according to the first embodiment.

FIG. 4 is a schematic cross-sectional view illustrating the configuration of another liquid crystal optical apparatus according to the first embodiment.

In the liquid crystal optical apparatus 112 according to the embodiment as illustrated in FIG. 4, the first width w11 of the first sub electrode 12a along the +X direction is narrower than the second width w12 of the second sub electrode 12b along the +X direction. In this example, the first distance d11 is the same as the second distance d12. Otherwise, the liquid crystal optical apparatus 112 is the same as the liquid crystal optical apparatus 111, and a description is therefore omitted.

In the liquid crystal optical apparatus 112 as well, the electric field density at the pretilt reverse side portion 11Q can be higher than the electric field density at the pretilt forward side portion 11P. Thereby, a liquid crystal optical apparatus that provides a high-quality display is obtained.

The first distance d11 may be different from the second distance d12 while the first width with is different from the second width w12.

In other words, the first substrate unit 10u may include at least one selected from the second distance d12 along the +X direction between the second main electrode 11b and the second sub electrode 12b being shorter than the first distance d11 along the +X direction between the first main electrode 11a and the first sub electrode 12a, and the second width w12 of the second sub electrode 12b along the +X direction being longer than the first width w11 of the first sub electrode 12a along the +X direction. Thereby, the electric field density at the pretilt reverse side portion 11Q can be higher than the electric field density at the pretilt forward side portion 11P; and the occurrence of the reverse tilt can be suppressed. Thereby, a liquid crystal optical apparatus that provides a high-quality display can be provided.

For example, the absolute value of the difference between the first width w11 and the second width w12 is not less than 2 μm and not more than 20 μm. For example, the absolute value of the difference between the first width w11 and the second width w12 is not less than 0.1 times and not more than 1 times the thickness of the liquid crystal layer 30. For example, the absolute value of the difference between the first width w11 and the second width w12 is not less than 0.005 times and not more than 0.05 times the disposition pitch of the first electrodes 11.

Figure 5:
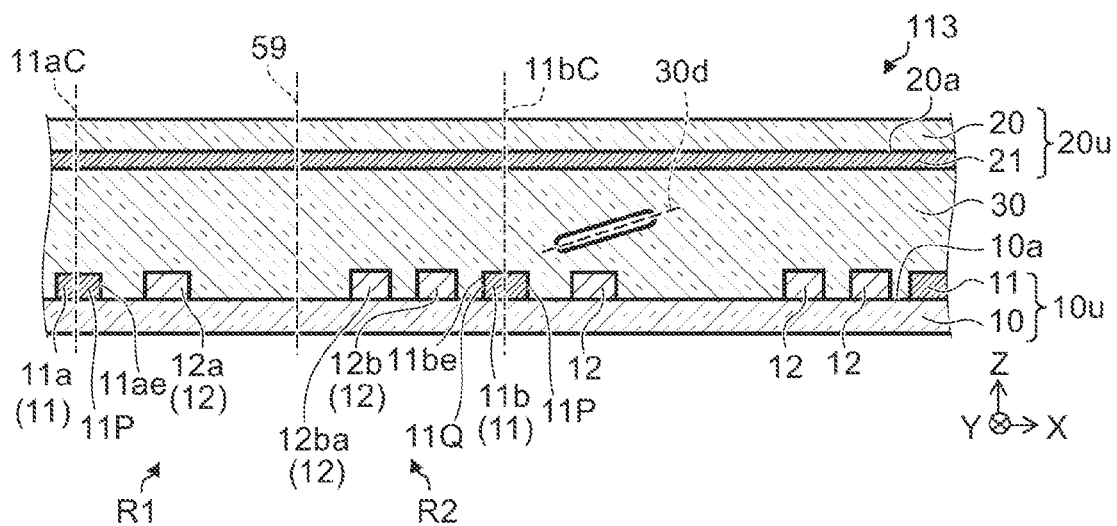
FIG. 5 is a schematic cross-sectional view illustrating the configuration of another liquid crystal optical apparatus according to the first embodiment.

FIG. 5 is a schematic cross-sectional view illustrating the configuration of another liquid crystal optical apparatus according to the first embodiment.

In the liquid crystal optical apparatus 113 according to the embodiment as illustrated in FIG. 5, the number of the second electrodes 12 provided in the second region R2 is greater than the number of the second electrodes 12 provided in the first region R1. Otherwise, the liquid crystal optical apparatus 113 is the same as the liquid crystal optical apparatus 111, and a description is therefore omitted.

Thus, the first substrate unit 10u may further include an electrode 12ba provided on the first major surface 10a between the central axis 59 and the second sub electrode 12b when projected onto the X-Y plane. The electrode 12ba extends in the Y-axis direction.

In such a case as well, the first substrate unit 10u includes at least one selected from the second distance d12 being shorter than the first distance d11 and the second width w12 being wider than the first width w11. Thereby, the occurrence of the reverse tilt can be suppressed; and a liquid crystal optical apparatus that provides a high-quality display can be provided.

Figure 6:
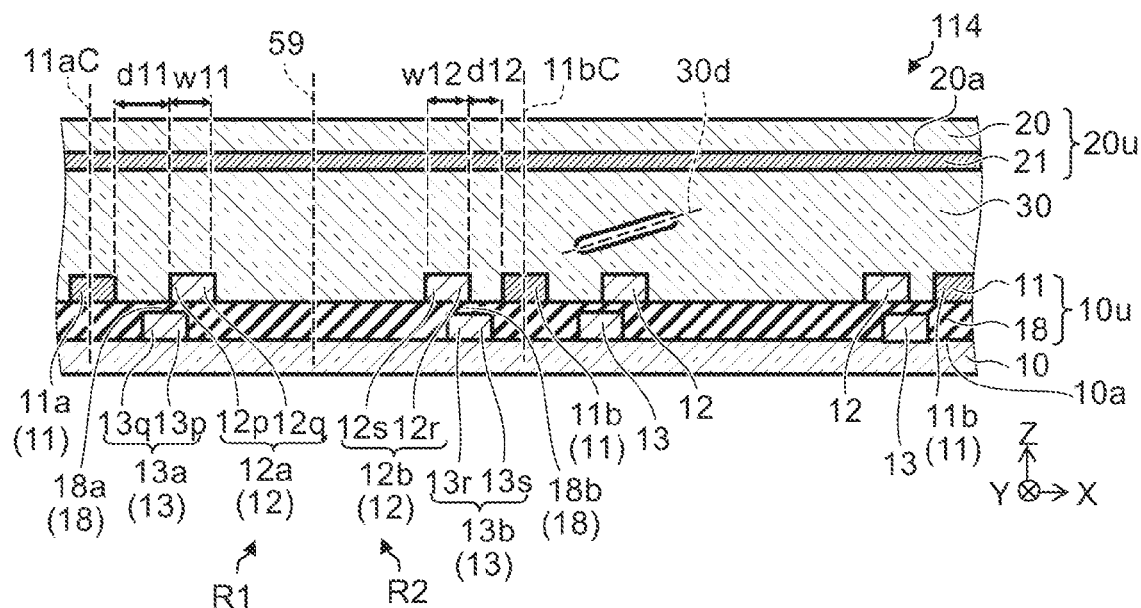
FIG. 6 is a schematic cross-sectional view illustrating the configuration of another liquid crystal optical apparatus according to the first embodiment.

FIG. 6 is a schematic cross-sectional view illustrating the configuration of another liquid crystal optical apparatus according to the first embodiment.

In the liquid crystal optical apparatus 114 according to the embodiment as illustrated in FIG. 6, a third electrode 13 and an insulating layer 18 are further provided in the first substrate unit 10u in addition to the first substrate 10, the first electrodes 11, and the second electrodes 12. Otherwise, the liquid crystal optical apparatus 114 is the same as the liquid crystal optical apparatus 111, and a description is therefore omitted.

In this example, at least a third sub electrode 13a and a fourth sub electrode 13b are provided as the third electrode 13. At least a first region insulating layer 18a and a second region insulating layer 18b are provided as the insulating layer 18.

The third sub electrode 13a is provided on the first major surface 10a in the first region R1. The first region insulating layer 18a is provided between the first sub electrode 12a and the third sub electrode 13a. The fourth sub electrode 13b is provided on the first major surface 10a in the second region R2. The second region insulating layer 18b is provided between the second sub electrode 12b and the fourth sub electrode 13b. In this example, the second region insulating layer 18b and the first region insulating layer 18a are continuous. However, the embodiment is not limited thereto. The second region insulating layer 18b and the first region insulating layer 18a may be discontinuous.

The third sub electrode 13a and the fourth sub electrode 13b extend in the Y-axis direction.

The first sub electrode 12a has a first superimposed portion 12p overlaying the third sub electrode 13a and a first non-superimposed portion 12q not overlaying the third sub electrode 13a when projected onto the X-Y plane. The third sub electrode 13a has a second superimposed portion 13p overlaying the first sub electrode 12a and a second non-superimposed portion 13q not overlaying the first sub electrode 12a when projected onto the X-Y plane.

The second sub electrode 12b has a third superimposed portion 12r overlaying the fourth sub electrode 13b and a third non-superimposed portion 12s not overlaying the fourth sub electrode 13b when projected onto the X-Y plane. The fourth sub electrode 13b has a fourth superimposed portion 13r overlaying the second sub electrode 12b and a fourth non-superimposed portion 13s not overlaying the second sub electrode 12b when projected onto the X-Y plane.

The first sub electrode 12a forms one electrode pair with the third sub electrode 13a. The second sub electrode 12b forms one other electrode pair with the fourth sub electrode 13b.

For example, the control unit 77 applies the first voltage between the opposing electrode 21 and the first electrodes 11 (e.g., the first main electrode 11a, the second main electrode 11b, etc.) and applies the second voltage between the opposing electrode 21 and the second electrodes 12 (e.g., the first sub electrode 12a, the second sub electrode 12b, etc.). The control unit 77 applies a third voltage between the opposing electrode 21 and the third electrodes 13 (e.g., the third sub electrode 13a, the fourth sub electrode 13b, etc.). For example, the absolute value (or the effective value) of the first voltage is greater than the absolute value (or the effective value) of the third voltage. The absolute value (or the effective value) of the second voltage is greater than the absolute value (or the effective value) of the third voltage. For example, the third voltage is zero volts.

A case where such voltages are applied is as follows. The refractive index is low in the region where the first electrode 11 opposes the opposing electrode 21. The refractive index is low in the region where the first non-superimposed portion 12$q$ opposes the opposing electrode 21 and the region where the third non-superimposed portion 12$s$ opposes the opposing electrode 21. The refractive index is high in the region where the second non-superimposed portion 13$q$ opposes the opposing electrode 21 and the region where the fourth non-superimposed portion 13$s$ opposes the opposing electrode 21. By providing the electrode pairs, the refractive index changes steeply at the boundary between the first non-superimposed portion 12$q$ and the second non-superimposed portion 13$q$ and at the boundary between the third non-superimposed portion 12$s$ and the fourth non-superimposed portion 13$s$. Thereby, the lens characteristics improve based on the refractive index distribution 31 that is formed; and, for example, stray light can be suppressed. Thereby, crosstalk can be reduced further.

In this example as well, the first substrate unit 10$u$ includes at least one selected from the second distance d12 being shorter than the first distance d11 and the second width w12 being wider than the first width w11. Thereby, the occurrence of the reverse tilt can be suppressed; and a liquid crystal optical apparatus that provides a high-quality display can be provided.

Second Embodiment

Figure 7:
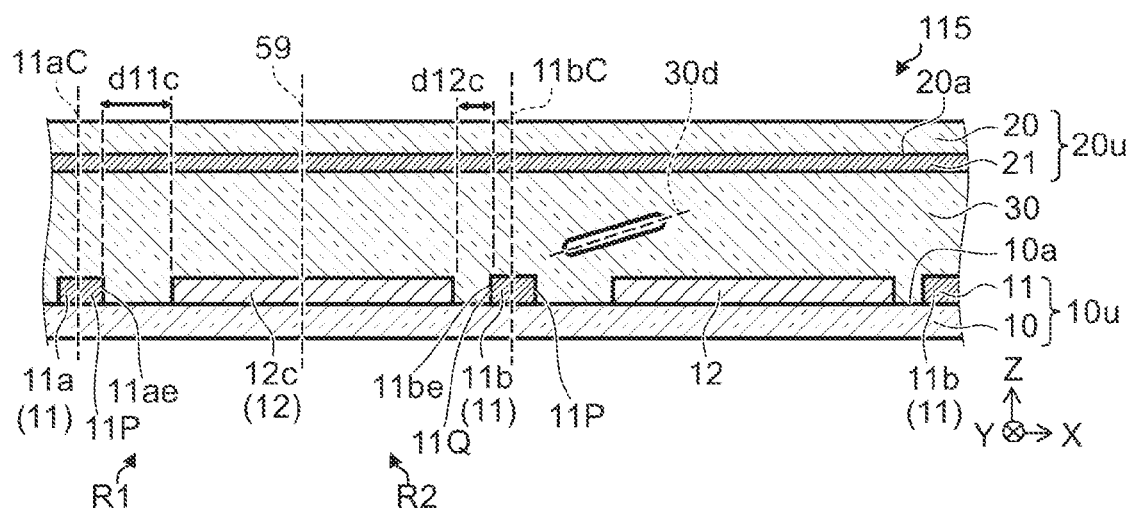
FIG. 7 is a schematic cross-sectional view illustrating the configuration of a liquid crystal optical apparatus according to a second embodiment.

FIG. 7 is a schematic cross-sectional view illustrating the configuration of a liquid crystal optical apparatus according to a second embodiment.

As illustrated in FIG. 7, the liquid crystal optical apparatus 115 according to this embodiment includes the first substrate unit 10$u$, the second substrate unit 20$u$, and the liquid crystal layer 30. In the liquid crystal optical apparatus 115, the configuration of the first substrate unit 10$u$ differs from that of the liquid crystal optical apparatus 111. Otherwise, the liquid crystal optical apparatus 115 is similar to the liquid crystal optical apparatus 111, and a description is therefore omitted. The first substrate unit 10$u$ of the liquid crystal optical apparatus 115 will now be described.

In this case as well, the first substrate unit 10$u$ includes the multiple first electrodes 11, the multiple second electrodes 12, and the first substrate 10 which has the first major surface 10$a$. Each of the multiple first electrodes 11 is provided on the first major surface 10$a$ to extend in the first direction (the Y-axis direction). The multiple first electrodes 11 are arranged in a direction (in this example, the X-axis direction) that intersects the Y-axis direction. Each of the multiple second electrodes 12 is provided between the multiple first electrodes 11. The second electrodes 12 extend in the Y-axis direction.

In this example, a lens center electrode 12$c$ is provided as the second electrode 12. The lens center electrode 12$c$ overlays the central axis 59 when projected onto the X-Y plane. The central axis 59 is the center between the center 11$a$C of the first main electrode 11$a$ which is the one of the most proximal first electrodes 11 and the center 11$b$C of the second main electrode 11$b$ which is the other of the most proximal first electrodes 11.

In such a case as well, the liquid crystal layer 30 has a pretilt in which the director of the liquid crystal is oriented from the first substrate unit 10$u$ toward the second substrate unit 20$u$ along the +X direction from the first main electrode 11$a$ toward the second main electrode 11$b$.

In the region of the liquid crystal optical apparatus 115 between the first main electrode 11$a$ and the second main electrode 11$b$, the distance (a first lens center distance d11$c$) along the +X direction between the first main electrode 11$a$ and the second electrode 12 (the lens center electrode 12$c$) is longer than the distance (a second lens center distance d12$c$) along the +X direction between the second main electrode 11$b$ and the second electrode 12 (the lens center electrode 12$c$).

In other words, in the liquid crystal optical apparatus 115, the second electrode 12 (e.g., the lens center electrode 12$c$) is disposed asymmetrically with respect to the central axis 59. Thereby, an asymmetrical electric field distribution is formed when the control unit 77 applies the voltages to the electrodes.

In other words, the electric field density on the pretilt reverse side portion 11Q of the second main electrode 11$b$ is higher than the electric field density on the pretilt forward side portion 11P of the first main electrode 11$a$. Thereby, the reverse tilt on the pretilt reverse side portion 11Q can be suppressed. Thereby, a liquid crystal optical apparatus that provides a high-quality display is obtained.

The liquid crystal optical apparatuses 111 to 114 described above may further include the second electrode 12 (e.g., the lens center electrode 12$c$) that overlays the central axis 59 when projected onto the X-Y plane.

Third Embodiment

Figure 8:
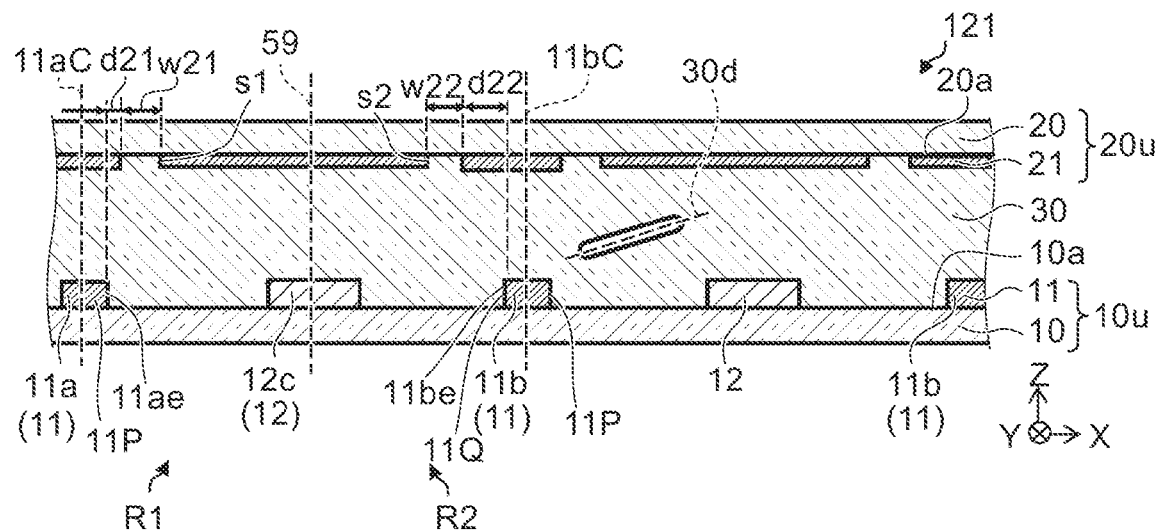
FIG. 8 is a schematic cross-sectional view illustrating the configuration of a liquid crystal optical apparatus according to a third embodiment.

FIG. 8 is a schematic cross-sectional view illustrating the configuration of a liquid crystal optical apparatus according to a third embodiment.

As illustrated in FIG. 8, the liquid crystal optical apparatus 121 according to this embodiment includes the first substrate unit 10$u$, the second substrate unit 20$u$, and the liquid crystal layer 30.

In such a case as well, the first substrate unit 10$u$ includes the multiple first electrodes 11, the multiple second electrodes 12, and the first substrate 10 which has the first major surface 10$a$. Each of the multiple first electrodes 11 is provided on the first major surface 10$a$ to extend in the first direction (the Y-axis direction). The multiple first electrodes 11 are arranged in a direction (in this example, the X-axis direction) that intersects the Y-axis direction. Each of the multiple second electrodes 12 is provided between the multiple first electrodes 11. The second electrodes 12 extend in the Y-axis direction.

In this example, the first substrate unit 10$u$ further includes the multiple second electrodes 12. Each of the multiple second electrodes 12 is provided between the multiple first electrodes 11. The second electrodes 12 extend in the Y-axis direction. In this example, the lens center electrode 12$c$ is provided as the second electrode 12. The lens center electrode 12$c$ overlays the central axis 59 when projected onto the X-Y plane. The second electrodes 12 may be provided if necessary and may be omitted.

The second substrate unit 20$u$ includes the second substrate 20 and the opposing electrode 21. The second substrate 20 has the second major surface 20$a$ opposing the first major surface 10$a$.

The opposing electrode 21 is provided on the second major surface 20$a$ to overlay the multiple first electrodes 11 when projected onto a plane (the X-Y plane) parallel to the first major surface 10$a$. The opposing electrode 21 includes a first slit s1 and a second slit s2.

The first slit s1 is provided in the first region R1 between the central axis 59 and the first main electrode 11a when projected onto the X-Y plane. The first slit s1 extends in the Y-axis direction. The first slit and the central axis 59 are parallel to the Y-axis direction to pass through the midpoint of a line segment connecting the X-axis direction (the second direction which is parallel to the first major surface 10a and perpendicular to the Y-axis direction) center 11aC of one electrode (the first main electrode 11a) of the most proximal first electrodes 11 to the X-axis direction center 11bC of the other electrode (the second main electrode 11b) of the most proximal first electrodes 11 when projected onto the X-Y plane.

The second slit s2 is provided in the second region between the central axis 59 and the second main electrode 11b when projected onto the X-Y plane. The second slit s2 extends in the Y-axis direction.

The liquid crystal layer 30 is provided between the first substrate unit 10u and the second substrate unit 20u. The liquid crystal layer 30 has a pretilt in which the director 30d of the liquid crystal is oriented from the first substrate unit 10u toward the second substrate unit 20u along the +X direction (the second direction) from the first main electrode 11a toward the second main electrode 11b.

In the liquid crystal optical apparatus 121, the distance (a first slit distance d21) along the +X direction between the first main electrode 11a and the first slit s1 is shorter than the distance (a second slit distance d22) along the +X direction between the second main electrode 11b and the second slit s2 when projected onto the X-Y plane.

In this example, the width (a first slit width w21) of the first slit Si along the +X direction is the same as the width (a second slit width w22) of the second slit s2 along the +X direction. As described below, the first slit width w21 may be wider than the second slit width w22.

In other words, in the liquid crystal optical apparatus 121, the slits are disposed to be shifted in X-axis direction from the first electrodes 11. Thus, by asymmetrically providing the slits, asymmetry is provided to the electric field density. Thereby, an asymmetrical electric field distribution is formed when the control unit 77 applies the voltages to the electrodes.

In other words, the electric field density on the pretilt reverse side portion 11Q of the second main electrode 11b is higher than the electric field density on the pretilt forward side portion 11P of the first main electrode 11a. Thereby, the reverse tilt on the pretilt reverse side portion 11Q can be suppressed. Thereby, a liquid crystal optical apparatus that provides a high-quality display is obtained.

For example, the first slit distance d21 is not less than 20 μm and not more than 200 μm. For example, the first slit distance d21 is not less than 0.5 times and not more than 10 times the thickness (the length along the Z-axis direction) of the liquid crystal layer 30. For example, the second slit distance d22 is not less than 0.05 times and not more than 0.4 times the disposition pitch of the first electrodes 11.

For example, the second slit distance d22 is not less than 20 μm and not more than 200 μM. For example, the second slit distance d22 is not less than 0.5 times and not more than 10 times the thickness of the liquid crystal layer 30. For example, the second slit distance d22 is not less than 0.05 times and not more than 0.4 times the disposition pitch of the first electrodes 11.

For example, the absolute value of the difference between the first slit distance d21 and the second slit distance d22 is not less than 2 μm and not more than 20 μm. For example, the absolute value of the difference between the first slit distance d21 and the second slit distance d22 is not less than 0.1 times and not more than 1 times the thickness of the liquid crystal layer 30. For example, the absolute value of the difference between the first slit distance d21 and the second slit distance d22 is not less than 0.005 times and not more than 0.05 times the disposition pitch of the first electrodes 11.

Figure 9:
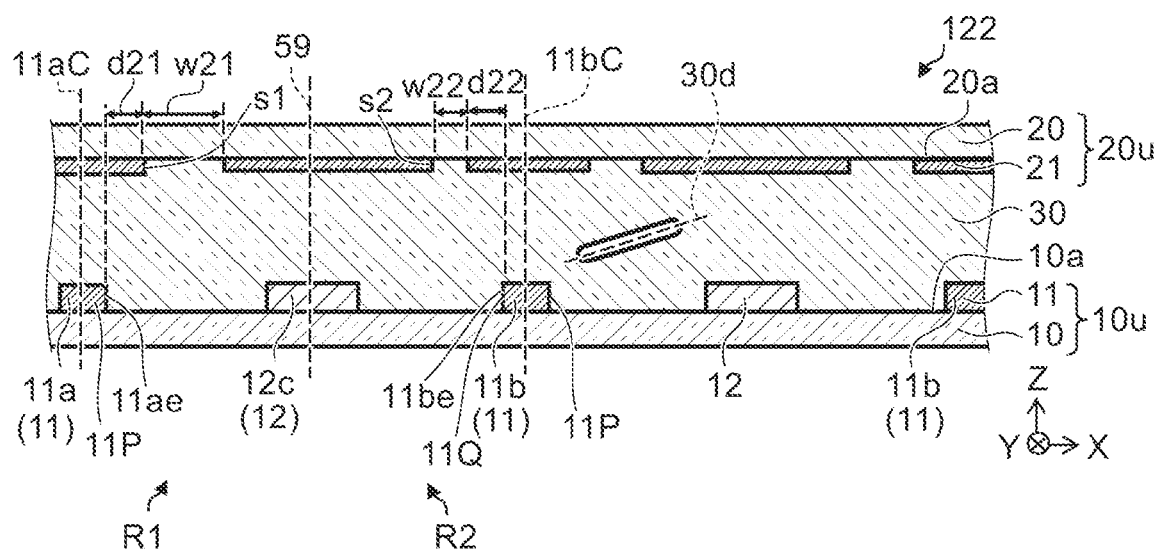
FIG. 9 is a schematic cross-sectional view illustrating the configuration of another liquid crystal optical apparatus according to the third embodiment.

FIG. 9 is a schematic cross-sectional view illustrating the configuration of another liquid crystal optical apparatus according to the third embodiment.

In the liquid crystal optical apparatus 122 according to the embodiment as illustrated in FIG. 9, the width (the first slit width w21) of the first slit s1 along the +X direction is wider than the width (the second slit width w22) of the second slit s2 along the +X direction. In this example, the first slit distance d21 is the same as the second slit distance d22. Otherwise, the liquid crystal optical apparatus 122 is the same as the liquid crystal optical apparatus 121, and a description is therefore omitted.

In the liquid crystal optical apparatus 122 as well, the electric field density at the pretilt reverse side portion 11Q can be higher than the electric field density at the pretilt forward side portion 11P. Thereby, a liquid crystal optical apparatus that provides a high-quality display is obtained.

For example, the absolute value of the difference between the first slit width w21 and the second slit width w22 is not less than 2 μm and not more than 20 μm. For example, the absolute value of the difference between the first slit width w21 and the second slit width w22 is not less than 0.1 times and not more than 1 times the thickness of the liquid crystal layer 30. For example, the absolute value of the difference between the first slit width w21 and the second slit width w22 is not less than 0.005 times and not more than 0.05 times the disposition pitch of the first electrodes 11.

The first slit distance d21 may be different from the second slit distance d22 while the first slit width w21 is different from the second slit width w22.

In other words, the second substrate unit 20u may include at least one selected from the distance (the second slit distance d22) along the +X direction between the second main electrode 11b and the second slit s2 being longer than the distance (the first slit distance d21) along the +X direction between the first main electrode 11a and the first slit s1 when projected onto the X-Y plane, and the width (the second slit width) of the second slit s2 along the +X direction being narrower than the width (the first slit width w21) of the first slit s1 along the +X direction when projected onto the X-Y plane. Thereby, the electric field density at the pretilt reverse side portion 11Q can be higher than the electric field density at the pretilt forward side portion 11P. Thereby, a liquid crystal optical apparatus that provides a high-quality display is obtained.

In the description recited above, the first slit distance d21 is determined relative to the second slit distance d22. For example, the first slit distance d21 may be defined as the distance along the +X direction between the +X direction center of the first slit s1 and the +X direction center 11aC of the first main electrode 11a. In such a case, the second slit distance d22 is the distance along the +X direction between the +X direction center of the second slit s2 and the +X direction center 11bC of the second main electrode 11b.

Fourth Embodiment

Figure 10:
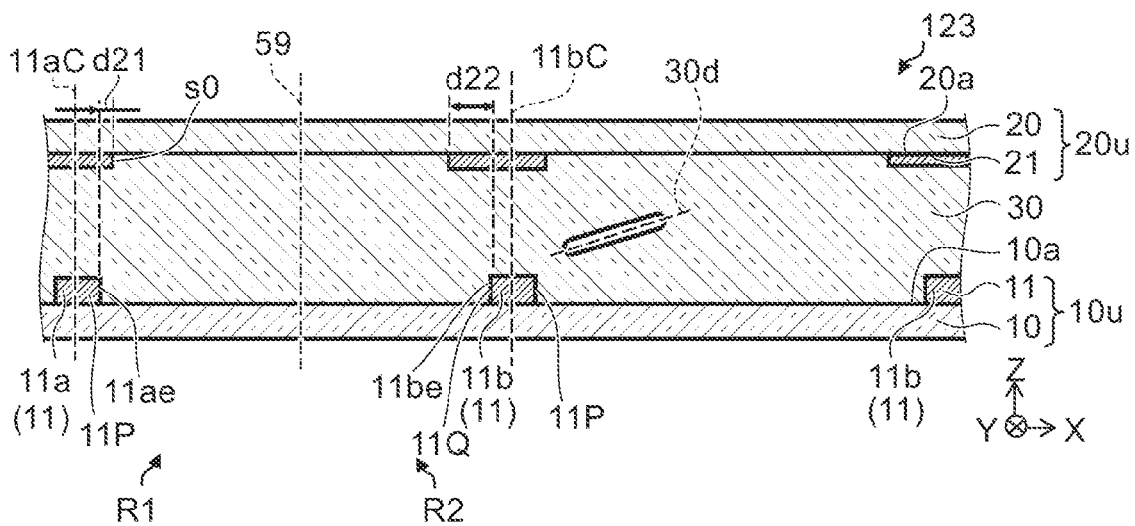
FIG. 10 is a schematic cross-sectional view illustrating the configuration of a liquid crystal optical apparatus according to a fourth embodiment.

FIG. 10 is a schematic cross-sectional view illustrating the configuration of a liquid crystal optical apparatus according to a fourth embodiment.

As illustrated in FIG. 10, the liquid crystal optical apparatus 123 according to this embodiment includes the first substrate unit 10u, the second substrate unit 20u, and the liquid crystal layer 30.

The first substrate unit 10u includes the multiple first electrodes 11 and the first substrate 10 which has the first major surface 10a. Each of the multiple first electrodes 11 is provided on the first major surface 10a to extend in the first direction (the Y-axis direction). The multiple first electrodes 11 are arranged in a direction that intersects the Y-axis direction. In this example, the multiple first electrodes 11 are arranged in the X-axis direction. The first substrate unit 10u may further include the second electrode 12.

The second substrate unit 20u includes the second substrate 20 and the opposing electrode 21. The second substrate 20 has the second major surface 20a opposing the first major surface 10a. The opposing electrode 21 is provided on the second major surface 20a. The opposing electrode 21 overlays the multiple first electrodes 11 when projected onto the X-Y plane (the plane parallel to the first major surface 10a). The opposing electrode 21 has a slit s0. The slit s0 extends in the Y-axis direction.

The liquid crystal layer 30 is provided between the first substrate unit 10u and the second substrate unit 20u. The liquid crystal layer 30 has a pretilt in which the director 30d of the liquid crystal is oriented from the first substrate unit 10u toward the second substrate unit 20u along the second direction (the +X direction) from the one electrode (the first main electrode 11a) of the most proximal first electrodes 11 toward the other electrode (the second main electrode 11b) of the most proximal first electrodes 11.

The distance (the first slit distance d21) along the +X direction between the first main electrode 11a and the slit s0 when projected onto the X-Y plane is shorter than the distance (the second slit distance d22) along the +X direction between the second main electrode 11b and the slit s0 when projected onto the X-Y plane.

Thereby, the electric field density at the pretilt reverse side portion 11Q can be higher than the electric field density at the pretilt forward side portion 11P. Thereby, a liquid crystal optical apparatus that provides a high-quality display is obtained.

Fifth Embodiment

Figure 11:
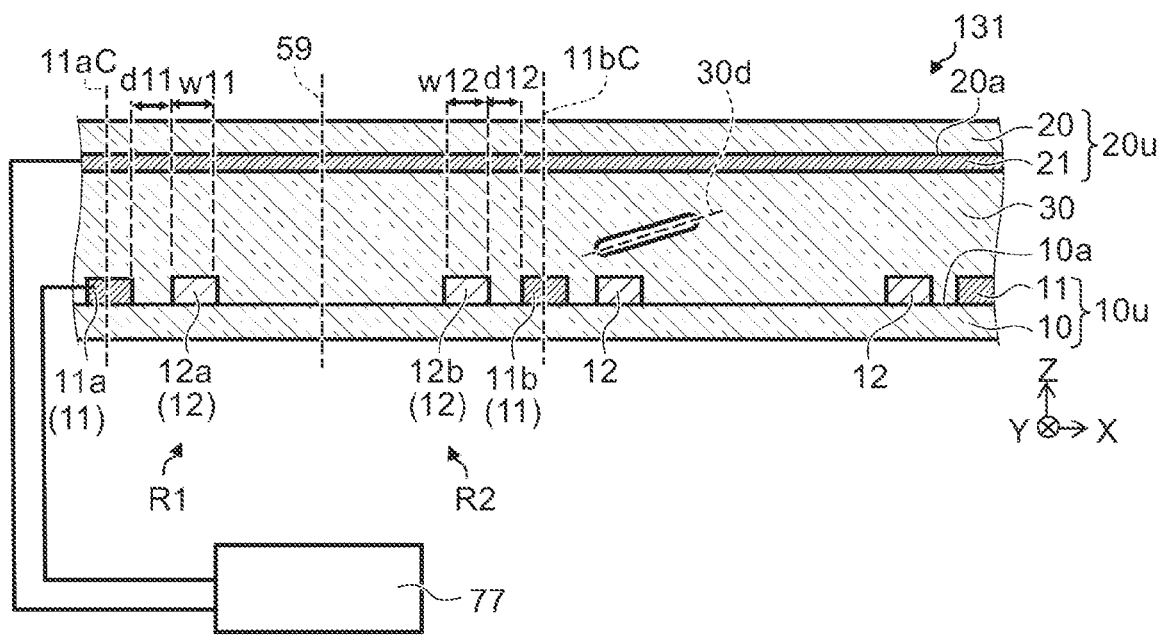
FIG. 11 is a schematic cross-sectional view illustrating the configuration of a liquid crystal optical apparatus according to a fifth embodiment.

FIG. 11 is a schematic cross-sectional view illustrating the configuration of a liquid crystal optical apparatus according to a fifth embodiment.

As illustrated in FIG. 11, the liquid crystal optical apparatus 131 according to this embodiment includes the first substrate unit 10u, the second substrate unit 20u, the liquid crystal layer 30, and the control unit 77.

The first substrate unit 10u includes the multiple first electrodes 11, the multiple second electrodes 12 (e.g., the first sub electrode 12a and the second sub electrode 12b), and the first substrate 10 which has the first major surface 10a.

Each of the multiple first electrodes 11 is provided on the first major surface 10a to extend in the first direction (the Y-axis direction). The multiple first electrodes are arranged in a direction that intersects the Y-axis direction.

The first sub electrode 12a is provided on the first major surface 10a. The first sub electrode 12a is provided in the first region R1 between the central axis 59 and the first main electrode 11a. The central axis 59 is parallel to the Y-axis direction to pass through the midpoint of a line segment connecting the second direction (the +X direction) center 11aC of the one electrode (the first sub electrode 12a) of the most proximal first electrodes 11 to the +X direction center 11bC of the other electrode (the second sub electrode 12b) of the most proximal first electrodes 11 when projected onto a plane (the X-Y plane) parallel to the first major surface 10a, where the second direction (the +X direction) is parallel to the X-Y plane and perpendicular to the Y-axis direction.

The second sub electrode 12b is provided on the first major surface 10a in the second region R2 between the central axis 59 and the second sub electrode 12b when projected onto the X-Y plane. The second sub electrode 12b extends in the Y-axis direction.

The second substrate unit 20u includes the second substrate which has the second major surface 20a that opposes the first major surface 10a, and the opposing electrode 21 provided on the second major surface 20a.

The liquid crystal layer 30 is provided between the first substrate unit 10u and the second substrate unit 20u. The liquid crystal layer 30 has a pretilt in which the director 30d of the liquid crystal is oriented from the first substrate unit 10u toward the second substrate unit 20u along the second direction (the +X direction) from the first main electrode 11a toward the second main electrode 11b.

The control unit 77 is electrically connected to the first electrodes 11, the first sub electrode 12a, the second sub electrode 12b, and the opposing electrode 21. For easier viewing of the drawings, the interconnect between the control unit 77 and the first sub electrode 12a and the interconnect between the control unit 77 and the second sub electrode 12b are not illustrated.

The control unit 77 causes the potential of the first sub electrode 12a to be different from the potential of the second sub electrode 12b. Thereby, the electric field density at the region adjacent to the first sub electrode 12a is different from the electric field density at the region adjacent to the second sub electrode 12b.

In such a case, the disposition of the electrodes may be symmetric. An asymmetrical electric field distribution can be formed by applying asymmetrical voltages.

Thereby, the electric field density on the pretilt reverse side portion 11Q of the second main electrode 11b is caused to be higher than the electric field density on the pretilt forward side portion 11P of the first main electrode 11a. Thereby, the reverse tilt on the pretilt reverse side portion 11Q can be suppressed. Thereby, a liquid crystal optical apparatus that provides a high-quality display is obtained.

Also, in the liquid crystal optical apparatus 131, the disposition of the electrodes may be asymmetrical. In other words, the first to fourth embodiments are applicable to the fifth embodiment. Thereby, the electric field density also can be asymmetrical; and the reverse tilt can be suppressed more easily.

The liquid crystal optical apparatus 131 may further include the second electrode 12 (e.g., the lens center electrode 12c) that overlays the central axis 59 when projected onto the X-Y plane.

An image display device that includes the image display unit 80, the liquid crystal optical apparatuses 111 to 115, 121 to 123, and 131, and liquid crystal optical apparatuses of modifications of the liquid crystal optical apparatuses 111 to 115, 121 to 123, and 131 can be formed. According to such an image display device, an image display device that provides a high-quality display can be provided.

The embodiments may have the following configurations.
Configuration 1
 A liquid crystal optical apparatus, comprising:
 a first substrate unit including
 a first substrate having a first major surface, multiple first electrodes provided on the first major surface to extend in a first direction, the multiple first electrodes being arranged in a direction that intersects the first direction, and multiple second electrodes provided between the multiple first electrodes to extend in the first direction;

a second substrate unit including a second substrate having a second major surface opposing the first major surface, and an opposing electrode provided on the second major surface; and a liquid crystal layer provided between the first substrate unit and the second substrate unit, the liquid crystal layer having a pretilt including a director of a liquid crystal oriented from the first substrate unit toward the second substrate unit along a second direction from the one electrode toward the other electrode, a distance along the second direction between the one electrode and the second electrode being longer than a distance along the second direction between the other electrode and the second electrode in a region between the one electrode and the other electrode.

Configuration 2

A liquid crystal optical apparatus, comprising:

a first substrate unit including a first substrate having a first major surface, and multiple first electrodes provided on the first major surface to extend in the first direction, the multiple first electrodes being arranged in a direction that intersects the first direction;

a second substrate unit including a second substrate having a second major surface opposing the first major surface, and an opposing electrode provided on the second major surface to overlay the multiple first electrodes when projected onto a plane parallel to the first major surface, the opposing electrode having a first slit provided in a first region between a central axis and one electrode of most proximal first electrodes to extend in the first direction when projected onto the plane parallel to the first major surface, the opposing electrode having a second slit provided in a second region between the central axis and the other electrode to extend in the first direction when projected onto the plane, the central axis being parallel to the first direction to pass through a midpoint of a line segment connecting a second-direction center of the one electrode to a second-direction center of the other electrode of the most proximal first electrodes, the second direction being parallel to the first major surface and perpendicular to the first direction; and a liquid crystal layer provided between the first substrate unit and the second substrate unit, the liquid crystal layer having a pretilt including a director of a liquid crystal oriented from the first substrate unit toward the second substrate unit along the second direction from the one electrode toward the other electrode, the second substrate unit including at least one selected from:

a distance along the second direction between the other electrode and the second slit being longer than a distance along the second direction between the one electrode and the first slit when projected onto the plane; and a width of the second slit along the second direction being narrower than a width of the first slit along the second direction when projected onto the plane.

Configuration 3

A liquid crystal optical apparatus, comprising:

a first substrate unit including a first substrate having a first major surface, and multiple first electrodes provided on the first major surface to extend in the first direction, the multiple first electrodes being arranged in a direction that intersects the first direction;

a second substrate unit including a second substrate having a second major surface opposing the first major surface; and an opposing electrode provided on the second major surface to overlay the multiple first electrodes when projected onto a plane parallel to the first major surface, the opposing electrode having a slit extending in the first direction; and a liquid crystal layer provided between the first substrate unit and the second substrate unit, the liquid crystal layer having a pretilt including a director of a liquid crystal oriented from the first substrate unit toward the second substrate unit along a second direction from one electrode of most proximal first electrodes toward the other electrode of the most proximal first electrodes, a distance along the second direction between the one electrode and the slit when projected onto the plane being shorter than a distance along the second direction between the other one electrode and the slit when projected onto the plane.

Configuration 4

A liquid crystal optical apparatus, comprising:

a first substrate unit including a first substrate having a first major surface, multiple first electrodes provided on the first major surface to extend in the first direction, the multiple first electrodes being arranged in a direction that intersects the first direction, a first sub electrode provided on the first major surface to extend in the first direction in a first region between a central axis and one electrode of most proximal first electrodes when projected onto a plane parallel to the first major surface, the central axis being parallel to the first direction to pass through a midpoint of a line segment connecting a second-direction center of the one electrode to a second-direction center of the other electrode of the most proximal first electrodes, the second direction being parallel to the plane and perpendicular to the first direction, and a second sub electrode provided on the first major surface to extend in the first direction in a second region between the central axis and the other electrode when projected onto the plane;

a second substrate unit including a second substrate having a second major surface opposing the first major surface, and an opposing electrode provided on the second major surface;

a liquid crystal layer provided between the first substrate unit and the second substrate unit, the liquid crystal layer having a pretilt including a director of a liquid crystal oriented from the first substrate unit toward the second substrate unit along the second direction from the one electrode toward the other electrode; and a control unit, the control unit being electrically connected to the first electrodes, the first sub electrode, the second sub electrode, and the opposing electrode, the control unit being configured to cause an electric field density on a portion of the other electrode between the center of the other electrode and an end of the other electrode on the one electrode side to be higher than an electric field density on a portion of the one electrode between the center of the one electrode and an end of the one electrode on the other electrode side.

Configuration 5

An image display device, comprising:
the liquid crystal optical apparatus according to any one of configurations 1-4 recited above; and
an image display unit stacked with the liquid crystal optical apparatus, the image display unit including a display unit configured to cause light including image information to be incident on the liquid crystal layer.

According to the embodiments, a liquid crystal optical apparatus and an image display device that provide a high-quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the invention is not limited to these specific examples. For example, one skilled in the art may similarly practice the invention by appropriately selecting specific configurations of components included in liquid crystal optical apparatuses such as first substrate units, second substrate units, liquid crystal layers, first substrates, second substrates, first electrodes, first main electrodes, second main electrodes, second electrodes, first sub electrodes, second sub electrodes, lens center electrodes, opposing electrodes, slits, insulating layers, and control units and specific configurations of components included in image display devices such as display units, display control units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and image display devices practicable by an appropriate design modification by one skilled in the art based on the liquid crystal optical apparatuses and the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical apparatus, comprising:
a first substrate unit including
a first substrate having a first major surface,
a plurality of first electrodes provided on the first major surface to extend in a first direction, the first electrodes being arranged in a direction intersecting the first direction,
a first sub electrode provided on the first major surface to extend in the first direction in a first region between a central axis and one electrode of most proximal first electrodes when projected onto a plane parallel to the first major surface, the central axis being parallel to the first direction to pass through a midpoint of a line segment connecting a center of the one electrode and a center of the other electrode of the most proximal first electrodes along a second direction being parallel to the plane and perpendicular to the first direction, and
a second sub electrode provided on the first major surface to extend in the first direction in a second region between the central axis and the other electrode when projected onto the plane;
a second substrate unit including
a second substrate having a second major surface opposing the first major surface, and
an opposing electrode provided on the second major surface; and
a liquid crystal layer provided between the first substrate unit and the second substrate unit, the liquid crystal layer having a pretilt including a director of a liquid crystal oriented from the first substrate unit toward the second substrate unit along the second direction from the one electrode toward the other electrode,
the first substrate unit including at least one selected from:
a first distance along the second direction between the one electrode and the first sub electrode being longer than a second distance along the second direction between the other electrode and the second sub electrode; and
a first width of the first sub electrode along the second direction being narrower than a second width of the second sub electrode along the second direction.

2. The apparatus according to claim 1, wherein the first substrate unit further includes an electrode provided on the first major surface to extend in the first direction between the central axis and the second sub electrode when projected onto the plane.

3. The apparatus according to claim 1, wherein:
the first substrate unit further includes
a third sub electrode provided on the first major surface,
a first region insulating layer provided between the first sub electrode and the third sub electrode,
a fourth sub electrode provided on the first major surface, and
a second region insulating layer provided between the second sub electrode and the fourth sub electrode;
the first sub electrode has a first superimposed portion overlaying the third sub electrode and a first non-superimposed portion not overlaying the third sub electrode when projected onto the plane;
the third sub electrode has a second superimposed portion overlaying the first sub electrode and a second non-superimposed portion not overlaying the first sub electrode when projected onto the plane;
the second sub electrode has a third superimposed portion overlaying the fourth sub electrode and a third non-superimposed portion not overlaying the fourth sub electrode when projected onto the plane; and the fourth sub electrode has a fourth superimposed portion overlaying the second sub electrode and a fourth non-superimposed portion not overlaying the second sub electrode when projected onto the plane.

4. The apparatus according to claim 3, further comprising a control unit configured
to apply a first voltage between the opposing electrode and the first electrodes,
to apply a second voltage between the first sub electrode and the opposing electrode and between second sub electrode and the opposing electrode, and
to apply a third voltage between the third sub electrode and the opposing electrode and between the fourth sub electrode and the opposing electrode,
an absolute value of the first voltage being greater than an absolute value of the third voltage, and an absolute value of the second voltage being greater than the absolute value of the third voltage.

5. The apparatus according to claim 1, further comprising a control unit, the control unit being electrically connected to the first electrodes, the first sub electrode, the second sub electrode, and the opposing electrode,
the control unit being configured to cause an electric field density on a portion of the other electrode between the center of the other electrode and an end of the other electrode on the one electrode side to be higher than an electric field density on a portion of the one electrode between the center of the one electrode and an end of the one electrode on the other electrode side.

6. The apparatus according to claim 5, wherein the control unit is configured
to apply a first voltage between the opposing electrode and the first electrodes, and
to apply a second voltage between the first sub electrode and the opposing electrode and between second sub electrode and the opposing electrode.

7. The apparatus according to claim 1, wherein
the first electrodes, the second electrodes, and the opposing electrode include an oxide including at least one of element selected from the group consisting of In, Sn, Zn, and Ti.

8. The apparatus according to claim 1, wherein
a liquid crystal included in the liquid crystal layer has a positive dielectric anisotropy, and
an initial alignment of the liquid crystal is a horizontal alignment.

9. The apparatus according to claim 1, wherein
a liquid crystal included in the liquid crystal layer has a negative dielectric anisotropy, and
an initial alignment of the liquid crystal is a vertical alignment.

10. The apparatus according to claim 1, wherein
the first distance is not less than 1 times and not more than 10 times a thickness of the liquid crystal layer, and
the second distance is not less than 0.5 times and not more than 10 times the thickness of the liquid crystal layer.

11. The apparatus according to claim 1, wherein
an absolute value of difference between the first distance and the second distance is not less than 2 μm and not more than 20 μm.

12. The apparatus according to claim 1, wherein
an absolute value of difference between the first distance and the second distance is not less than 0.5 times and not more than 10 times a thickness of the liquid crystal layer.

13. The apparatus according to claim 1, wherein
an absolute value of difference between the first distance and the second distance is not less than 2 μm and not more than 20 μm.

14. The apparatus according to claim 1, wherein
an absolute value of difference between the first distance and the second distance is not less than 0.1 times and not more than 1 times a thickness of the liquid crystal layer.

15. A liquid crystal optical apparatus, comprising:
a first substrate unit including
a first substrate having a first major surface,
a plurality of first electrodes provided on the first major surface to extend in a first direction, the first electrodes being arranged in a direction that intersects the first direction, and
a plurality of second electrodes provided between the first electrodes to extend in the first direction;
a second substrate unit including
a second substrate having a second major surface opposing the first major surface, and
an opposing electrode provided on the second major surface; and
a liquid crystal layer provided between the first substrate unit and the second substrate unit, the liquid crystal layer having a pretilt including a director of a liquid crystal oriented from the first substrate unit toward the second substrate unit along a second direction from the one electrode toward the other electrode, the second direction being parallel to the first major surface and perpendicular to the first direction,
a distance along the second direction between the one electrode and the second electrode being longer than a distance along the second direction between the other electrode and the second electrode in a region between the one electrode and the other electrode, wherein
the opposing electrode overlays the first electrodes when projected onto a plane parallel to the first major surface,
the opposing electrode has a first slit provided in a first region between a central axis and one electrode of most proximal first electrodes to extend in the first direction when projected onto the plane parallel to the first major surface, the opposing electrode having a second slit provided in a second region between the central axis and the other electrode to extend in the first direction when projected onto the plane, the central axis being parallel to the first direction to pass through a midpoint of a line segment connecting a center of the one electrode to a center of the other electrode of the most proximal first electrodes, and
the second substrate unit including at least one selected from:
a first slit distance along the second direction between the one electrode and the first slit being shorter than a second slit distance along the second direction between the other electrode and the second slit when projected onto the plane; and
a first slit width of the first slit along the second direction being wider than a second width of the second slit along the second direction when projected onto the plane.

16. The apparatus according to claim 15, wherein
the first slit distance is not less than 1 times and not more than 10 times a thickness of the liquid crystal layer, and
the second slit distance is not less than 0.5 times and not more than 10 times the thickness of the liquid crystal layer.

17. The apparatus according to claim 15, wherein
an absolute value of difference between the first slit distance and the second slit distance is not less than 0.1 times and not more than 1 times a thickness of the liquid crystal layer.

18. The apparatus according to claim 15, wherein
an absolute value of difference between the first slit width and the second slit width is not less than 0.1 times and not more than 1 times a thickness of the liquid crystal layer.

19. An image display device, comprising:
a liquid crystal optical apparatus, including:
   a first substrate unit including
      a first substrate having a first major surface,
      a plurality of first electrodes provided on the first major surface to extend in a first direction, the first electrodes being arranged in a direction intersecting the first direction,
      a first sub electrode provided on the first major surface to extend in the first direction in a first region between a central axis and one electrode of most proximal first electrodes when projected onto a plane parallel to the first major surface, the central axis being parallel to the first direction to pass through a midpoint of a line segment connecting a center of the one electrode and a center of the other electrode of the most proximal first electrodes along a second direction being parallel to the plane and perpendicular to the first direction, and
      a second sub electrode provided on the first major surface to extend in the first direction in a second region between the central axis and the other electrode when projected onto the plane;
   a second substrate unit including
      a second substrate having a second major surface opposing the first major surface, and
      an opposing electrode provided on the second major surface; and
   a liquid crystal layer provided between the first substrate unit and the second substrate unit, the liquid crystal layer having a pretilt including a director of a liquid crystal oriented from the first substrate unit toward the second substrate unit along the second direction from the one electrode toward the other electrode,
   the first substrate unit including at least one selected from:
      a first distance along the second direction between the one electrode and the first sub electrode being longer than a second distance along the second direction between the other electrode and the second sub electrode; and
      a first width of the first sub electrode along the second direction being narrower than a second width of the second sub electrode along the second direction; and
an image display unit stacked with the liquid crystal optical apparatus, the image display unit including a display unit configured to cause light including image information to be incident on the liquid crystal layer.

* * * * *